United States Patent
Wu et al.

[11] Patent Number: 5,912,906
[45] Date of Patent: Jun. 15, 1999

[54] METHOD AND APPARATUS FOR RECOVERING FROM CORRECTABLE ECC ERRORS

[75] Inventors: Chang-Hong Wu, Cupertino; Gary Lauterbach, Los Altos Hills, both of Calif.

[73] Assignee: Sun Microsystems, Inc., Palo Alto, Calif.

[21] Appl. No.: 08/880,369

[22] Filed: Jun. 23, 1997

[51] Int. Cl.[6] ........................... G11C 29/00
[52] U.S. Cl. ............ 371/40.11; 371/10.2; 371/40.14; 395/182.14; 395/182.15
[58] Field of Search ............ 371/40.11, 40.14, 371/10.2, 37.01, 5.1; 370/458; 395/182.5, 182.14, 185.07, 290, 800.3, 894, 182.15; 365/185.21, 185.22, 229; 375/287, 262

[56] References Cited

U.S. PATENT DOCUMENTS 5,341,487  8/1994  Derwin et al. ..................... 395/425
5,517,626  5/1996  Archer et al. ..................... 395/290

*Primary Examiner*—William Grant
*Assistant Examiner*—McDieunel Marc
*Attorney, Agent, or Firm*—Townsend and Townsend and Crew

[57] ABSTRACT

On-chip delivery of data from an on-chip or off-chip cache is separated into two buses. A fast fill bus provides data to latency critical caches without ECC error detection and correction. A slow fill bus provides the data to latency insensitive caches with ECC error detection and correction. Because the latency critical caches receive the data without error detection, they receive the data at least one clock cycle before the latency insensitive caches, thereby enhancing performance if there is no ECC error. If an ECC error is detected, a software trap is executed which flushes the external cache and the latency sensitive caches that received the data before the trap was generated. If the error is correctable, ECC circuitry corrects the error and rewrites the corrected data back to the external cache. If the error is not correctable, the data is read from main memory to the external cache.

20 Claims, 4 Drawing Sheets

```
fast_correctable_ecc_error_trap:

ldxa   [%g0]ASI_ASYNC_FAULT_ADDRESS,%l0   ! read physical address      }—300
                                              ! of the ECC error stxa   %g0,[%l0]ASI_DCACHE_FLUSH          ! invalidate the D$ line     }—310
                                              ! that contains the bad
                                              ! data stxa   %g0,[%l0]ASI_ECACHE_FORCE_COPYBACK ! copyback the E$ line       }
                                              ! that contains the bad      |
                                              ! data - data will be         }—320
                                              ! corrected on the way       |
                                              ! out to memory              } call   log_corrected_ecc_error            ! perform the normal         }
                                              ! single bit ECC error        }—330
                                              ! logging                    } set    AFSR_UC_BIT,%l0                    ! Clear the UC bit of        }—340
    stxa   %l0,[%g0]ASI_ASYNC_FAULT_STATUS    ! the AFSR retry                                     ! re-execute the inst.       }—350
```

*FIG. 4.*

METHOD AND APPARATUS FOR RECOVERING FROM CORRECTABLE ECC ERRORS

BACKGROUND OF THE INVENTION

The present invention relates to the use of error correction codes (ECC) for detecting and correcting errors during data transport, and specifically to a method and apparatus that ensures faster data transport when there is no error, and which corrects any correctable errors.

A number of schemes exist for correcting errors and detecting corruption of data during transport, for example, data transmitted between agents over a network or between an external memory and a processor's internal memory cache. One example of a scheme for detecting errors in a data field is parity. When data is received, the parity of the data field is checked and an error is detected if the parity does not match the predetermined parity (odd or even). This works well for detecting single bit errors. Another example of an error detection scheme is a CRC (cyclic redundancy check) checksum. When receiving data, the complete data sequence, which includes CRC bits appended to the end of the data field, are read by a CRC checker. The complete sequence should be exactly divisible by a CRC polynomial. If they are not, an error has been detected. Implemented in hardware, the CRC check is an exclusive OR (XOR) of each bit position.

Closely related to the CRC are ECC codes (error correcting or error checking and correcting). ECC codes are sometimes referred to as EDC codes for error detecting and correcting. ECC codes are in principle CRC codes whose redundancy is so extensive that they can restore the original data if an error occurs that is not too disastrous. ECC codes are used, for example, for magnetic data recording with floppy or hard disk drives as well as for fail-safe RAM memory systems. A memory controller with embedded ECC logic, for example, is able to repair soft errors in DRAM chips caused by natural radioactivity in the air or tiny amounts of radioactive substances in the chip substrate. The ionizing effect of alpha-particles causes additional charges in the storage area of a DRAM memory cell which may distort the held value.

FIG. 1 depicts an example of a memory system 10 using embedded ECC logic (or CRC logic) for error detection and correction. Memory system 10 incudes bus interface 20, memory 25 and memory controller 30. Memory 25 is any memory device such as a floppy or a hard drive, for example. Memory system 10 is useful for transferring data between memory 25 and main memory or RAM (not shown), which is usually one or more banks of DRAM chips, for example. Data is transferred through controller 30 to and from bus interface 20 and controller chip 35. Bus interface 20 provides the connection to the main memory. Controller chip 35 determines the ECC (or CRC) bytes and provides any necessary formatting such as converting parallel submitted data into serial data and vice versa. ECC logic 40 (or CRC) generates and/or checks ECC bytes (or CRC bytes) being transmitted between bus interface 20 and memory 25. If an error is detected ECC (CRC) logic 40 generates an error detect signal to controller 35, and if the error is correctable, ECC logic 40 handles correction. Microprocessor 50 provides overall control, including synchronization, of controller chip 35 ECC (CRC) logic 40 and memory interface 60 of memory controller 30. Microcode ROM 55 provides the necessary instructions for microprocessor 50, and memory interface 60 provides the necessary interface to memory 25, depending on the memory type.

Modern CPUs use embedded ECC correction logic, such as ECC logic 40 in FIG. 1, in an attempt to detect and correct certain data errors occurring during data transport. Of particular importance in CPUs is the ability to detect and correct errors in data transported from an on- or off-chip memory cache to certain performance critical on-chip caches, such as prefetch, write, data and instruction caches. Such correction usually requires extra cycles in the data path, thus increasing data access latency and decreasing the CPU's performance. Accordingly, what is needed in the art is a method and apparatus for detecting and correcting errors that ensures that no extra latency is added to the data when there is no error, but which corrects correctable errors gracefully when there is an error.

SUMMARY OF THE INVENTION

To execute an instruction, a CPU requests data from a main memory. If the requested data already resides in a cache, the data is delivered from the cache. If not, the data is transported from the main memory to the cache and the CPU. According to the invention, onchip delivery of data from an external (off-chip) or internal (on-chip) cache is separated into two buses to enhance CPU performance. A fast fill bus provides data to latency critical caches, such as instruction and data caches, without ECC error detection and correction. A slow fill bus provides the data to latency insensitive caches, such as write and prefetch caches, with ECC error detection and correction. Because the latency critical caches receive the data without error detection, they receive the data at least one clock cycle before the latency insensitive caches, thereby enhancing performance if there is no ECC error. If an ECC error is detected, a software trap is executed which flushes the errored cache line of the external cache and the corresponding cache lines of the latency sensitive caches that received the data before the trap was generated. If the error is correctable, ECC circuitry corrects the error and rewrites the corrected data back to the external cache line. If the error is not correctable, the data is read from main memory to the external cache line. The errored instruction is then re-executed.

According to an aspect of the invention, an integrated chip is provided comprising: a first memory cache; a second memory cache; a first bus for providing data to the first cache from a memory cache external to the chip; a second bus for providing the data to the second cache from the external cache; and a first ECC circuit, coupled to the second bus, wherein the first ECC circuit checks for errors in the data on the second bus, wherein the data is provided to the first cache without being checked for errors, such that the data is provided to the first cache at least one clock cycle before the data is provided to the second cache.

According to another aspect of the invention, an integrated chip is provided comprising: a first memory cache; a second memory cache; a third memory cache, wherein data is stored in the third cache from a memory external to the chip; a first bus for providing the data to the first cache from the third cache; a second bus for providing the data to the second cache from the third cache; and a first ECC circuit, coupled to the second bus, wherein the first ECC circuit checks for errors in the data on the second bus; wherein the data is provided to the first cache without being checked for errors, such that the data is provided to the first cache at least one clock cycle before the data is provided to the second cache.

According to yet another aspect of the invention, a method is provided for providing data to a first cache and a second cache on an integrated chip from a cache external to the chip, the method comprising the steps of: a) providing data to the first cache from the external cache over a first bus; b) providing the data to a first ECC circuit over a second bus; c) checking the data for errors in the first ECC circuit; and thereafter d) providing the data to the second cache from the first ECC circuit over the second bus, such that the data is provided to the first cache at least one clock cycle before the data is provided to the second cache.

The invention will be further understood upon review of the following detailed description in conjunction with the drawings.

BRIEF DESCRIPTION OF THE DRAWINGS

FIG. 4 shows an example of code for a software trap handler according to the present invention.

DESCRIPTION OF THE PREFERRED EMBODIMENT

Figure 1:
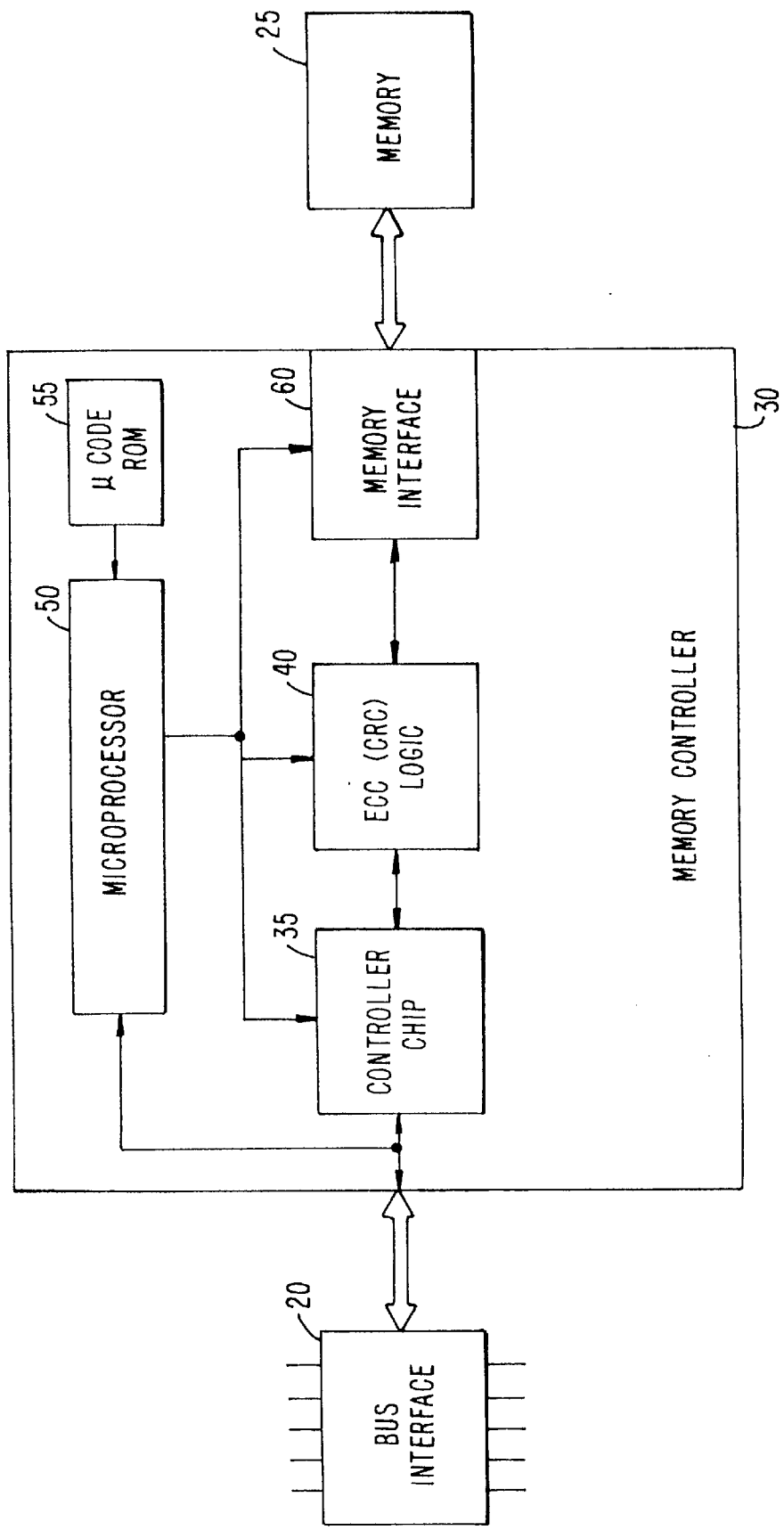
FIG. 1 depicts an example of a memory system using embedded ECC logic.
Figure 2:
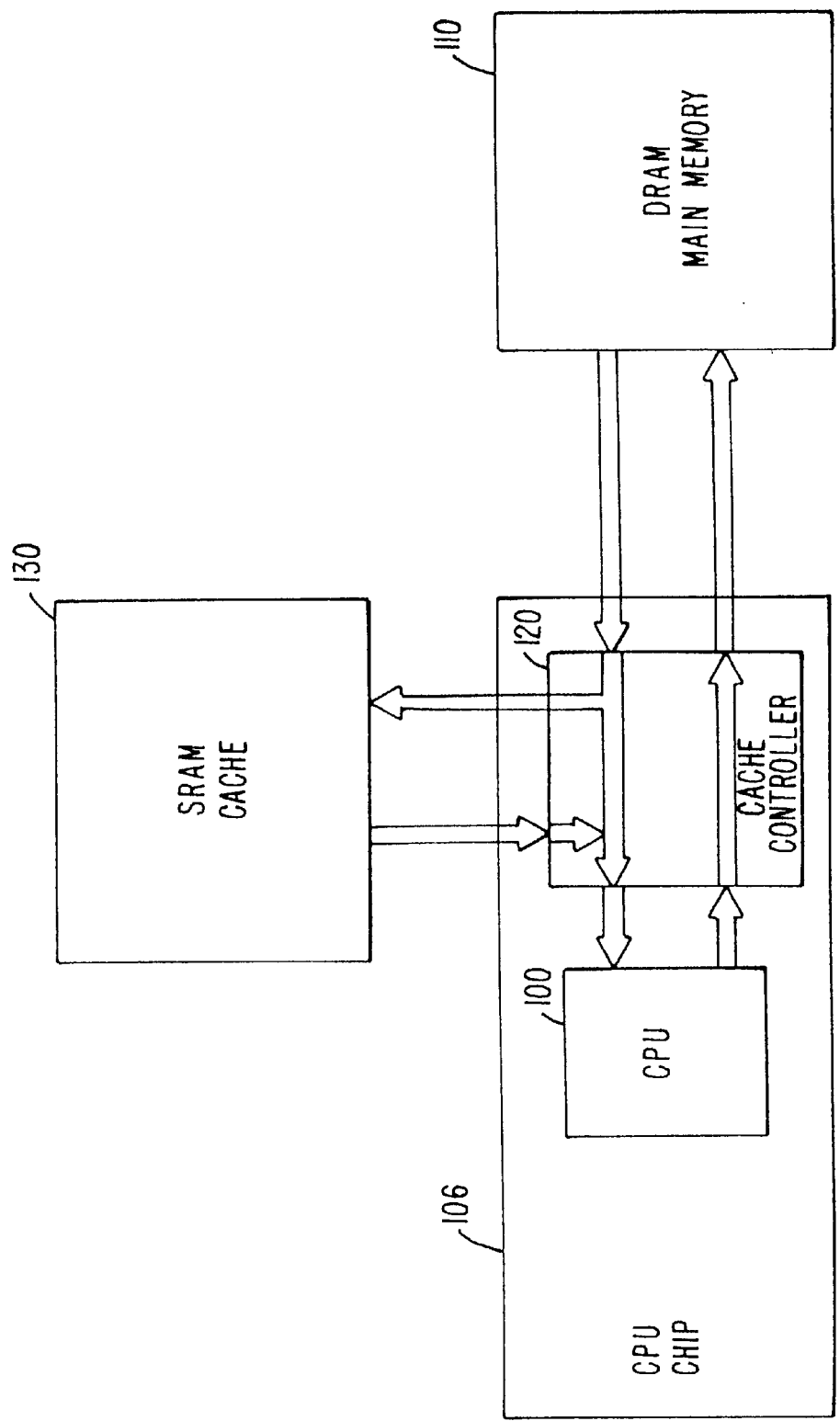
FIG. 2 is a block diagram of a cache system.

FIG. 2 is a block diagram of a cache system. A cache unit is placed between CPU 100 and main memory 110 and includes cache controller 120 and cache memory 130. Cache 130 and cache controller 120 can be included on the same chip 106 as CPU 100 (on-chip cache) or can exist as separate components. Additionally, cache controller 120 can be included on the CPU chip 106 while cache 130 is formed by external chips (off-chip) as shown in FIG. 2. Cache 130 holds data frequently accessed from main memory 110 and delivers it very quickly. Cache 130, in one embodiment, comprises one or more banks of one or more SRAM chips, but may be any non-volatile RAM memory with a fast access time. Main memory 110 in one embodiment comprises one or more banks each having one or more DRAM chips. SRAM components typically offer access times of about 15–25 nanoseconds (ns), whereas DRAM components typically have access times of about 60–100 ns. The process of writing and reading data from cache 130 is controlled by controller 120 which implements various write strategies, such as write-through, write-back or write-allocate.

The cache system is typically transparent to the CPU. When the CPU reads data, it sends out a request with a memory address to main memory 110. Cache controller 120 intercepts or receives the request and determines whether the requested data is available in cache 130. If the data is available in cache 130 (cache hit), the controller reads the data from the quicker cache memory and passes it on to the CPU. On the other hand, if the data is not in the cache (cache miss), the read access is switched through to main memory 110. Cache controller 120 reads the data from main memory 110 and transfers it to CPU 100 and cache 130 simultaneously. The CPU typically operates as if no cache memory were present; the cache memory is transparent to the CPU.

Figure 3:
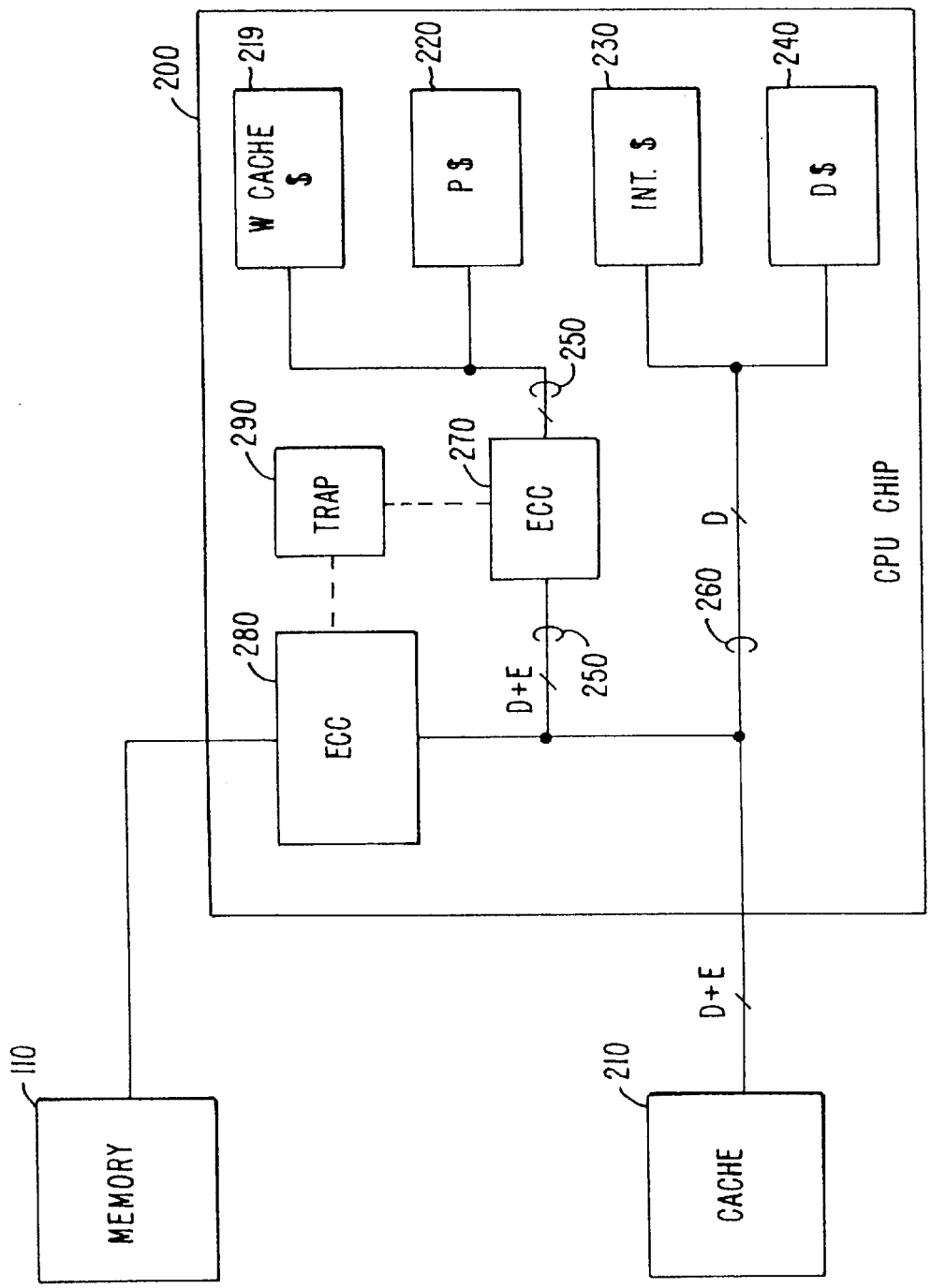
FIG. 3 is a block diagram of an embodiment of a CPU with a cache system according to the present invention.

FIG. 3 is a block diagram of an embodiment of a CPU with a cache system according to the present invention. CPU chip 200 is connected to main memory 110 and cache 210. Cache 210 includes cache memory 130 and controller 120. Although cache 210 is shown as an off-chip cache, cache 210 may be entirely on-chip. As above, cache memory 130 may be off-chip with controller 120 on-chip.

CPU chip 200 includes a CPU (not shown) coupled to first cache 219, second cache 220, third cache 230 and fourth cache 240. First cache 219 and second cache 220 are coupled to cache 210 by a first bus 250. Third cache 230 and fourth cache 240 are coupled to cache 210 by a second bus 260. In one embodiment, first cache 219 and second cache 220 are write and prefetch caches, respectively, but they may also be any cache that is not latency critical. Third cache 230 and fourth cache 240, in one embodiment, are instruction and data caches, respectively, but may also be any cache that is latency critical or sensitive.

In operation, when the CPU receives an instruction that requires that data be processed, the CPU generates a data request. If the requested data already resides in cache memory 130, controller 120 will read the requested data from cache memory 130. Otherwise controller 120 will read data from main memory 110 into cache memory 130 and pass it on to the internal caches. As shown in FIG. 3, on-chip data delivery is separated into two buses, one called the fast fill bus 260 and the other called the slow fill bus 250. Fast fill bus 260 provides data quickly to latency critical caches 230 and 240 without any ECC detection and correction. Fast fill bus 260, thus, provides data with no extra clock cycles added because of ECC correction circuitry. Slow fill bus 250 provides data to the latency insensitive caches 219 and 220, and includes first ECC correction and detection circuitry 270 which checks the data, and corrects correctable errors.

Second ECC circuitry 280 provides for error detection and correction of data transported to and from memory 110. An example of an ECC code used by the present invention for detecting and correcting single bit errors, detecting two-bit errors, and detecting multiple bit errors within a nibble is given in copending application Ser. No. 08/963,501, filed Nov. 3, 1997, which is hereby incorporated by reference. The invention is not limited to use of the above ECC code, however, and any ECC code may be used as necessitated by the data transfer system.

According to an embodiment of the invention, if data requested by the CPU resides on cache 130, controller 120 provides the data and the appended ECC bits (D+E in FIG. 3) over slow fill bus 250 to first ECC circuitry 270. Controller 120 also provides the data without the ECC bits appended thereto (D in FIG. 3) over fast fill bus to latency sensitive caches 230 and 240. In this way latency sensitive caches 230 and 240 receive the requested data quickly, whereas the data delivered to latency insensitive caches 219 and 220 through first ECC circuitry 270 is delayed by at least one clock cycle relative to the fast fill bus delivery. In the event that no errors are detected by first ECC circuitry 270, providing data to latency critical caches 230 and 240 without any delay due to error detection results in enhanced CPU performance.

Thus, performance critical portions of the CPU receive the data initially over fast fill bus 260, ensuring that performance is not degraded if there is no ECC error. In the instance where first ECC circuitry 270 detects an error, an error signal is issued to the CPU. In one embodiment, CPU chip 200 includes a trap generator 290. When an error is detected, ECC circuitry 270 issues an error detect signal to trap generator 290. Trap generator 290 puts the CPU into a trap mode and a software trap handler is executed. In the software trap handler, the affected data is flushed from the internal caches that have already received the data (i.e., caches 230 and 240) and cache 130. In one embodiment, if the error is correctable using the ECC codes, the data which has been read from the external cache through the slow fill bus 250 is corrected by first ECC circuitry 270 and written back into the external cache as corrected data. If the error is not correctable, the data is reread from main memory 110 through second ECC circuitry 280 into cache 130. Second ECC circuitry 280 is coupled to trap generator 290 and checks for errors, and corrects any correctable errors. The CPU then restarts from the trap point and re-executes the instruction normally.

FIG. 4 shows an example of code for a software trap handler according to the present invention. If a correctable error is detected by first ECC circuitry 270, trap generator 290 will execute a precise trap. The address of the correctable error is read from an address register at step 300. Data is flushed from the cache line of caches 230 and 240 corresponding to the error address at step 310 (The errored data will have been written into the latency sensitive caches before the trap is signaled). Data is flushed from the cache line of cache 130 that contained the single bit error at step 320, and if it was modified, the single bit error will be corrected during the write-back. The single bit error is logged at step 330. The UC bit of the address register is cleared at step 340, and the instruction is re-executed at step 350.

The invention has now been explained with reference to specific embodiments. Other embodiments will be apparent to those of ordinary skill in the art upon reference to the present description. It is therefore not intended that this invention be limited, except as indicated by the appended claims.

What is claimed is:

1. An integrated system comprising:

a first memory cache;

a second memory cache;

a first bus for providing data to said first cache from a third memory cache in response to an instruction;

a second bus for providing said data to said second cache from said third cache in response to said instruction; and a first ECC circuit, coupled to said second bus, wherein said first ECC circuit checks for errors in said data on said second bus;

wherein said data is provided to said first cache without being checked for errors, such that said data is provided to said first cache at least one clock cycle before said data is provided to said second cache.

2. The integrated system of claim 1, wherein said data from said third cache includes a data field with an ECC bit field appended thereto, and wherein said first ECC circuit checks for errors in said data field and said ECC bit field.

3. The integrated system of claim 1, further comprising:

a trap generator coupled to said first ECC circuit, wherein if said first ECC circuit detects an error in said data, said trap generator generates a trap that causes at least a portion of said first cache to be flushed.

4. The integrated system of claim 3, wherein said data is stored to a first portion of said third cache from a memory, and wherein said generated trap further causes said first portion of said third cache to be flushed.

5. The integrated system of claim 3, wherein said trap further causes said instruction to be restarted if an error is detected by said first ECC circuit.

6. The integrated system of claim 1, wherein said first ECC circuit corrects said data if a correctable error is detected.

7. The integrated system of claim 1, wherein said third cache comprises a SRAM.

8. The integrated system of claim 1, wherein said first cache is one of an instruction cache and a data cache, and wherein said second cache is one of a write cache and a prefetch cache.

9. An integrated system comprising:

a first memory cache on a chip;

a second memory cache on said chip;

a third memory cache, wherein data is stored in said third cache from a memory external to said chip;

a first bus for providing said data to said first cache from said third cache;

a second bus for providing said data to said second cache from said third cache; and a first ECC circuit, coupled to said second bus, wherein said first ECC circuit checks for errors in said data on said second bus;

wherein said data is provided to said first cache without being checked for errors, such that said data is provided to said first cache at least one clock cycle before said data is provided to said second cache.

10. The integrated chip of claim 9, wherein said third cache comprises a SRAM, and wherein said external memory comprises a DRAM.

11. A method of providing data to a first cache and a second cache in an integrated system from a third cache, the method comprising the steps of:

a) providing data to the first cache from the third cache over a first bus in response to an instruction;

b) providing said data to a first ECC circuit from the third cache over a second bus in response to said instruction;

c) checking said data for errors in said first ECC circuit; and thereafter d) providing said data to the second cache from said first ECC circuit over said second bus, such that said data is provided to said first cache at least one clock cycle before said data is provided to said second cache.

12. The method of claim 11, wherein said data from said third cache includes a data field with an ECC bit field appended thereto, wherein said checking step c) includes the step of checking for errors in said data field together with said ECC bit field.

13. The method of claim 11, further including the step of storing said data to a first portion of said third cache from a memory prior to said step a) of providing to said first cache, and wherein said step c) of checking said data includes the step of generating a trap if said first ECC circuit detects an error.

14. The method of claim 13, wherein said step of generating a trap includes the step of flushing said first portion of said third cache and at least a second portion of said first cache.

15. The method of claim 13, wherein said step of generating a trap includes the step of flushing at least a second portion of said first cache.

16. The method of claim 13, further comprising the step of restarting said instruction if said first ECC circuit detects an error.

17. The method of claim 13, wherein said step of generating a trap includes the steps of:

restoring said data to said first portion of said third cache from said memory; and thereafter repeating steps a) through d).

18. The method of claim 11, wherein said third cache comprises a SRAM.

19. The method of claim 11, wherein said first external cache is one of an instruction cache and a data cache, and wherein said second cache is one of a write cache and a prefetch cache.

20. The method of claim 11, wherein said step c) of checking includes the step of correcting said data if said first ECC circuit detects a correctable error.

* * * * *